United States Patent
Marzorati et al.

(10) Patent No.: US 11,803,247 B2
(45) Date of Patent: Oct. 31, 2023

(54) GESTURE-BASED CONTROL OF PLURAL DEVICES IN AN ENVIRONMENT

(71) Applicant: KYNDRYL, INC., New York, NY (US)

(72) Inventors: Mauro Marzorati, Lutz, FL (US); Todd Russell Whitman, Bethany, CT (US); Jeremy R. Fox, Georgetown, TX (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/509,568

(22) Filed: Oct. 25, 2021

(65) Prior Publication Data
US 2023/0131489 A1    Apr. 27, 2023

(51) Int. Cl.
*G06F 3/01*    (2006.01)
*G06F 9/451*    (2018.01)

(52) U.S. Cl.
CPC ............. *G06F 3/017* (2013.01); *G06F 3/016* (2013.01); *G06F 9/451* (2018.02)

(58) Field of Classification Search
CPC ........... G06F 3/017; G06F 3/016; G06F 9/451
See application file for complete search history.

(56) References Cited

U.S. PATENT DOCUMENTS

| | | |
|---|---|---|
| 8,325,134 B2 | 12/2012 | Hill et al. |
| 8,824,802 B2 | 9/2014 | Kutiroff et al. |
| 9,030,498 B2 | 5/2015 | Galor et al. |
| 9,619,105 B1 | 4/2017 | Dal Mutto |
| 9,817,479 B2 | 11/2017 | Brakensiek et al. |
| 10,139,918 B2 * | 11/2018 | Bedikian ............... G06F 3/0325 |
| 10,353,532 B1 * | 7/2019 | Holz ................... G06F 3/04812 |
| 10,928,921 B2 | 2/2021 | Hoffnung et al. |
| 2009/0262986 A1 | 10/2009 | Cartey et al. |
| 2010/0208038 A1 | 8/2010 | Kutiroff et al. |
| 2011/0234638 A1 | 9/2011 | Hill et al. |

(Continued)

FOREIGN PATENT DOCUMENTS

| | | |
|---|---|---|
| EP | 1615109 A2 | 1/2006 |
| WO | 2012157793 A1 | 11/2012 |

OTHER PUBLICATIONS

Mirta F. Villarreal et al., "The Effect of the Visual Context in the Recognition of Symbolic Gestures", PLOS ONE 7 (2): e29644. doi:10.1371/journal.pone.0029644, Feb. 21, 2012, 7 pages.

(Continued)

*Primary Examiner* — Sahlu Okebato
(74) *Attorney, Agent, or Firm* — Dan Housley; Andrew M. Calderon; Calderon Safran & Cole P.C (57) ABSTRACT

A computer-implemented method includes: predicting, by a computing device, devices for inclusion in an interface; generating, by the computing device, the interface including areas corresponding to the devices; detecting, by the computing device, a user selection of one of the areas of the interface; detecting, by the computing device, a hand gesture associated with the selected one of the areas; and transmitting, by the computing device, data defining the hand gesture to a respective one of the devices corresponding to the selected one of the areas, thereby causing the respective one of the devices to execute a command based on the hand gesture.

19 Claims, 6 Drawing Sheets

(56) References Cited

U.S. PATENT DOCUMENTS

| | | | |
|---|---|---|---|
| 2012/0216154 A1* | 8/2012 | Li | H04N 21/42224 |
| | | | 715/863 |
| 2013/0044053 A1 | 2/2013 | Galor et al. | |
| 2013/0222223 A1 | 8/2013 | Brakensiek et al. | |
| 2014/0033134 A1 | 1/2014 | Pimmel et al. | |
| 2019/0377420 A1* | 12/2019 | Hoffnung | G06F 3/0482 |
| 2023/0004344 A1* | 1/2023 | Giles | G06F 3/167 |

OTHER PUBLICATIONS

Unknown, "IBM Watson is AI for smarter business", https://www.ibm.com/watson, downloaded Jul. 9, 2021, 9 pages.

Unknown, "Internet of Things on IBM Cloud", https://www.ibm.com/cloud/internet-of-things?utm_content=SRCWW&p1=Search&p4=43700064670128702&p5=e&gclid=1934ba56c4d513809b04db200312384b&gclsrc=3p.ds, downloaded Oct. 25, 2021, 9 pages.

Unknown, "IoT Platform Market Size to Reach USD 13.310 Billion by 2026—Valuates Reports", https://reports.valuates.com/market-reports/QYRE-Othe-1F293/iot-platforms-software, May 14, 2020, 7 pages.

Christopher Ackad et al., "An in-the-wild study of learning mid-air gestures to browse hierarchical information at a large interactive public display", Proceedings of the 2015 ACM International Joint Conference on Pervasive and Ubiquitous Computing, 1. Faculty of Engineering and Information Technologies 2. Faculty of Architecture, Design, and Planning, The University of Sydney, NSW, 2006, 12 pages.

\* cited by examiner

GESTURE-BASED CONTROL OF PLURAL DEVICES IN AN ENVIRONMENT

BACKGROUND

Aspects of the present invention relate generally to hand gesture control of computing devices and, more particularly, to assigning hand gestures to one or more session devices using a generated visual boundary and based on context.

Home and workplace environments can include computing devices that a user can control using hand gestures. In one example, a wearable device includes one or more sensors, the data of which is used to determine different hand gestures made by a user wearing the device. Data defining the determined hand gesture is provided to a controllable computing device that executes a command that is associated with the gesture. In an environment with plural controllable computing device, the user may control different ones of the devices using different hand gestures. In some situations, the different devices may be programmed so that a same gesture is used to control different functions of the different devices depending on which device the user is engaged with when they make the gesture.

SUMMARY

In a first aspect of the invention, there is a computer-implemented method including: predicting, by a computing device, devices for inclusion in an interface; generating, by the computing device, the interface including areas corresponding to the devices; detecting, by the computing device, a user selection of one of the areas of the interface; detecting, by the computing device, a hand gesture associated with the selected one of the areas; and transmitting, by the computing device, data defining the hand gesture to a respective one of the devices corresponding to the selected one of the areas, thereby causing the respective one of the devices to execute a command based on the hand gesture.

In another aspect of the invention, there is a computer program product including one or more computer readable storage media having program instructions collectively stored on the one or more computer readable storage media. The program instructions are executable to: predict devices for inclusion in an interface, the predicted devices being a subset of plural devices in a smart home environment; generate the interface including areas corresponding to the devices; map the areas to respective physical spaces; detect a gesture of a hand in one of the physical spaces; and transmit data defining the gesture to a respective one of the devices corresponding to the one of the physical spaces, thereby causing the respective one of the devices to execute a command based on the gesture In another aspect of the invention, there is system including a processor, a computer readable memory, one or more computer readable storage media, and program instructions collectively stored on the one or more computer readable storage media. The program instructions are executable to: predict devices for inclusion in an interface, the predicting being based on a combination of context and historical usage of plural devices in an environment; generate the interface including areas corresponding to the predicted devices; detect a gesture of a hand in a physical space corresponding to one of the areas; and transmit data defining the gesture to a respective one of the devices corresponding to the one of the areas, thereby causing the respective one of the devices to execute a command based on the gesture.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to hand gesture control of computing devices and, more particularly, to assigning hand gestures to one or more session devices using a generated visual boundary and based on context. A user might wish to control a single device or plural devices at a time using hand gestures. In this environment, the user may wish to submit a command to a single device or plural devices based on the current situation. For example, the user may wish to submit a set of commands to a same device or to multiple devices in sequence. However, to accomplish the act of controlling plural different devices using hand gestures, the user must engage with each device individually prior to performing the hand gesture to control that device. For example, to provide control gestures to two different devices, the user must engage with the first device (e.g., by speaking a wake word for the first device) and then perform a hand gesture for the first device, and then engage with the second device (e.g., by speaking a wake word for the second device) and then perform a hand gesture for the second device. This approach is disadvantageous because it is a tedious way to provide hand gesture controls to devices in an environment that has plural controllable devices, and because the user cannot control plural devices simultaneously with a single hand gesture.

Aspects of the invention address this shortcoming of the technology by presenting a visual display of plural controllable devices and permitting a user to select one or more devices to control based on their hand position relative to the visual display. In embodiments, the system predicts which devices to include in the display based on the user's historic interactions and a context of the current situation. As a result, the display at a first time (e.g., during a first session) may differ from the display at a second time (e.g., during a second session). In embodiments, the system determines which device the user has selected to control based on the position of the user's hand relative to the display, determines a gesture performed by the user, and provides data defining the gesture to the selected device. In this manner, the user can quickly and easily change which device they are controlling by moving their hand relative to the display, rather than having to remember and say a different wake word for each controllable device. In accordance with further aspects of the invention, the user may provide input that combines two areas of the display, so that a hand gesture performed in this combined area of the display results in that command being provided simultaneously to both devices associated with the combined area of the display. In this manner, the user may quickly and easily provide commands to two devices simultaneously using a single hand gesture. Aspects of the invention thus improve automated environments by providing a technical solution to the problem of how to control plural different devices using hand gestures in a user-friendly (e.g., easy and efficient) manner.

As described herein, implementations of the invention assign contextual meaning to a single gesture to multiple session boundary visualizations (e.g., displays), where the visualizations are refined by contextual surroundings and a set of possible interactions for a given surrounding are rendered.

Implementations of the invention predict and create one or more session boundary visualizations of one or more devices or contextual situations based on the historical learning of smartwatch and/or IoT (Internet of Things) based gesture recognition.

In embodiments, while submitting any gesture-based command, a user may keep their hand position within a defined session boundary and, based on this, the system executes the gesture command with the devices assigned for the session boundary.

In embodiments, the system shows the created session boundaries on a smartwatch display. In this manner, with appropriate haptic and display interfaces, the user can ascertain the relative position of the user's hand within different session boundaries and, upon selecting any boundary, the user can submit a gesture-based command to the device associated with the selected boundary.

According to aspects of the invention, a user can navigate from one session boundary to another session boundary with hand movement around the visual surrounding or with touch interaction on the smartwatch display surface. In this manner, the user can select and interact with a desired session boundary and execute the commands with the devices for the selected session boundary.

In accordance with further aspects of the invention, a user can utilize touch input via a smartwatch or augmented reality (AR) interaction to merge plural session boundaries into a single boundary or to split one session boundary into plural separate boundaries. In this aspect, the system assigns devices to the merged or split session boundaries.

In implementations, the user can ascertain which sessions are expired with appropriate visualization icons while sessions are still active. As a result, the user can ascertain an appropriate command to be submitted for any selected session boundary.

In embodiments, the system expires sessions at variable times in accordance with the types of devices that are part of the session. For example, the act of putting down a newspaper, e-reader, etc., finishes a reading session but does not expire a session for a clam-shell style computer such as a laptop or DVD player.

In accordance with aspects of the invention there is a method to assign a single gesture to multiple session devices by a generated session boundary, the method comprising: identifying one or more IoT devices in a proximity of a user, wherein each IoT device is configured to receive hand gesture inputs; predicting based on historical usage, biometric data and/or preferences, a user intends to interact with at least first IoT device; generating one or more session boundary visualizations of one or more IoT devices or contextual situations based on the historical learning of smartwatch/IoT based gesture recognition, wherein when the session boundaries are shown on the smartwatch display, with appropriate haptic and display interfaces, the user can understand relative position of user's hand within different session boundaries, and upon selecting any boundary, user can submit gesture-based command; and while submitting any gesture-based command, the user keeps their hand position within the defined session boundary and accordingly the gesture command will be executed with the devices assigned for the session boundary. In the method, the user can navigate from one session boundary to another session boundary with hand movement around the visual surrounding or with touch interaction on the smartwatch display surface. In the method using touch with smartwatch or augmented reality interaction, the user can merge or split one or more session boundary and the display shows which sessions are expired with appropriate visualization icons while sessions are still active and accordingly the user can understand appropriate commands to be submitted for any selected session boundary.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
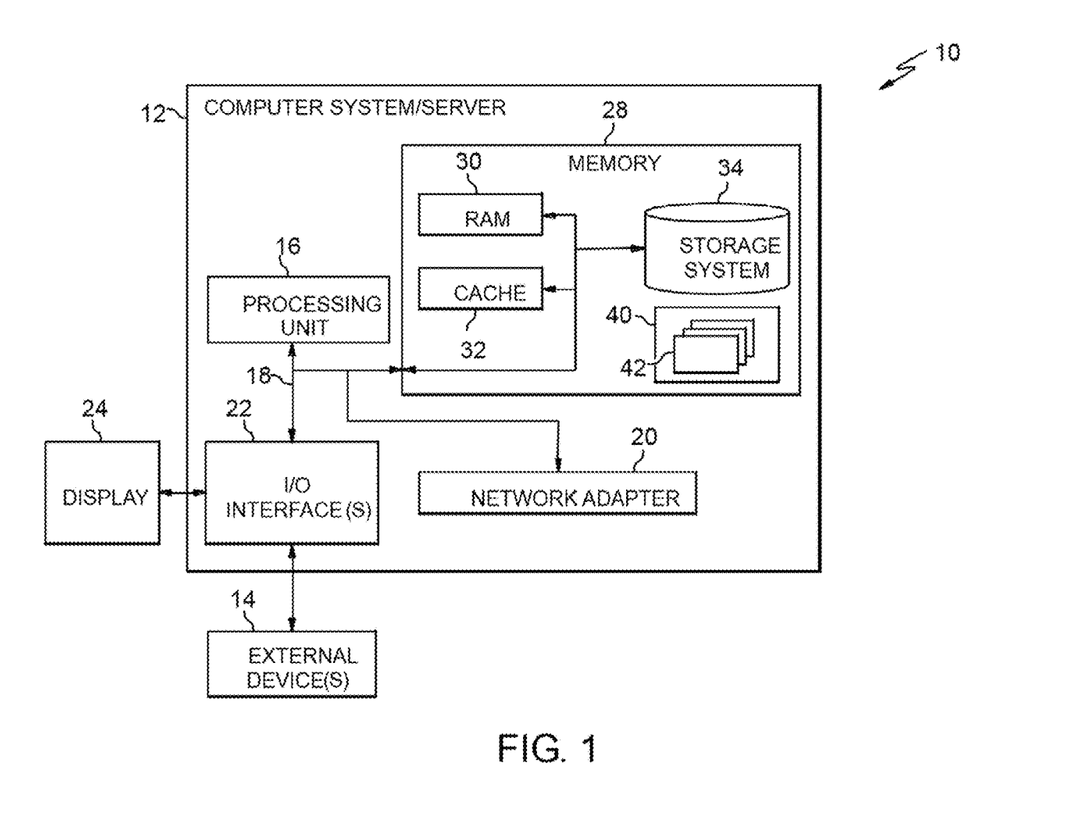
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
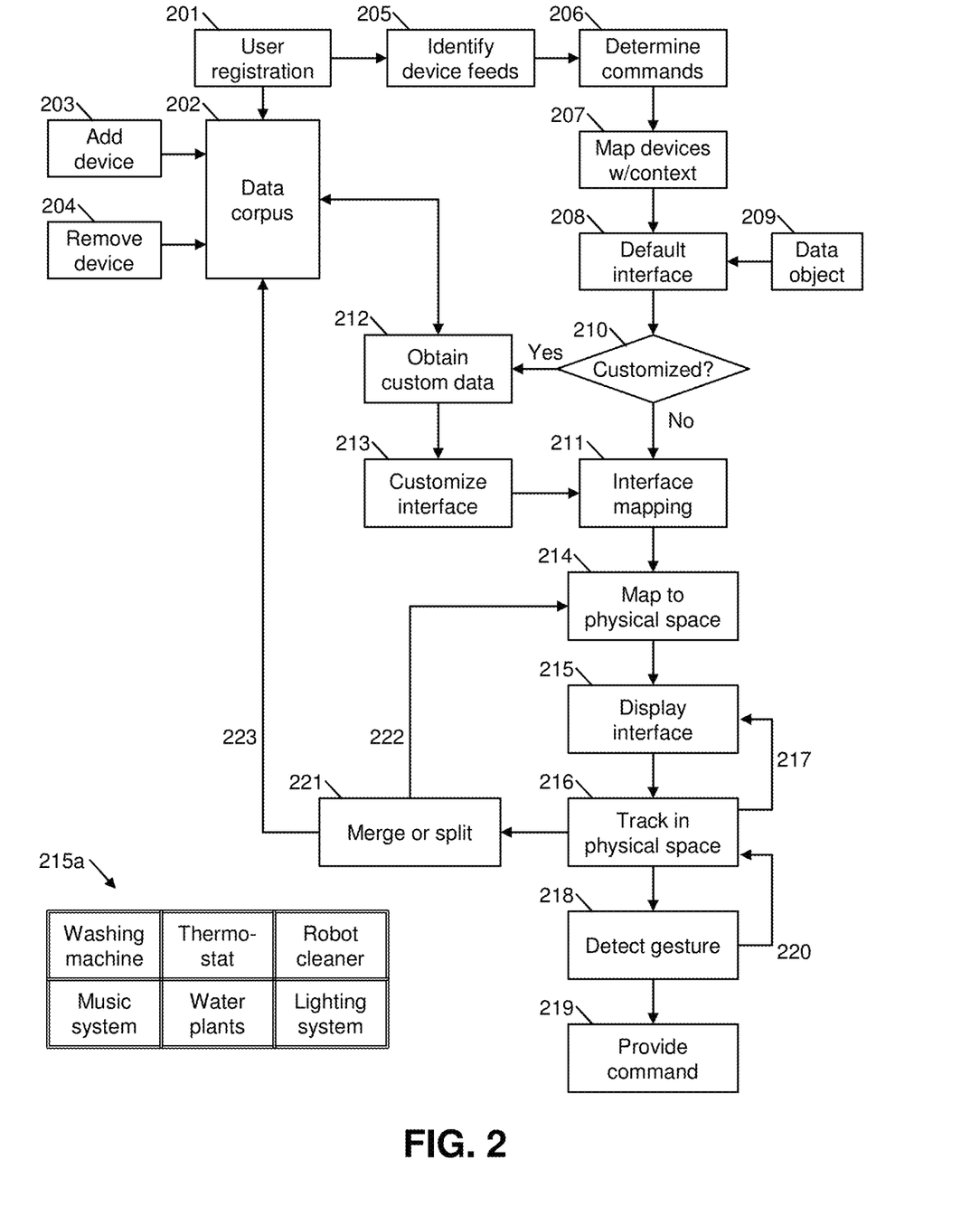
FIG. 2 shows a block diagram of an exemplary process for gesture-based controlling of multiple devices in accordance with aspects of the invention.

FIG. 2 shows a block diagram of an exemplary process for gesture-based controlling of multiple devices in accordance with aspects of the invention. At step 201, a user registers with the system. The system stores the user registration data in a data corpus 202. The user may add devices to the system at step 203 and remove devices from the system at step 204 at any time. A device in this context refers to a computing device, such as an IoT device, that is controllable using hand gestures. Adding a new device includes registering the device with the system and the system storing device data in the data corpus 202. Removing a device includes de-registering the device with the system and the system deleting device data from the data corpus 202. At step 205, the system identifies device feeds, e.g., feeds of registered devices identified in the corpus. At step 206, based on historical data, the system determines contextual commands per device. In embodiments, this includes analyzing the historical data of a device to identify situations where the user provided multiple gesture-based commands to the device. At step 207, the system maps the devices with contexts. In embodiments, this includes analyzing historical data of the device and historical context data to determine contexts in which the user provides a particular gesture-based command to the device, thereby mapping different gesture-based commands to different contexts for the device.

With continued reference to FIG. 2, at step 208 the system defines an interface (also referred to as a boundary) based on a default format. In embodiments, the system classifies the interface by assigning each of the devices in the interface. The default format of interface may be based on an interface data object 209. At step 210, the system determines whether there is user customization for the interface. If there is no customization, then at step 211 the system derives a virtual mapping for the default interface. In embodiments, the mapping includes assigning each device to a unique area (also called a session) within the interface for a predicted time span. If there is customization, then at step 212 the system obtains data defining the customization from the data corpus 202. For example, this user may have previously interacted with the system and defined a customization for the way the interface is displayed, and the system saves data defining this customization in the data corpus 202. When this user subsequently interacts with the system, the system recognizes the user and automatically obtains this data. At step 213, the system customizes the interface based on the data defining this customization, after which the process proceeds to step 211 where the system derives a virtual mapping for the customized interface. In embodiments, the mapping includes assigning each device to a unique area (also called a session) within the customized interface for a predicted time span.

At step 214, the system maps the areas in the interface to physical space in the vicinity of the user. In embodiments, the system defines a respective three-dimensional volume in physical space for each of the areas in the interface. In this manner, when the system detects the user's hand in one of the volumes in physical space, the system equates this to the user's hand being in the area of the interface associated with that particular volume, thus providing a mechanism for the user to provide input to select which of the devices to control with a gesture.

Still referring to FIG. 2, at step 215 the system displays the interface to the user. In embodiments, the system displays the interface on a smartwatch display or an AR display. Box 215a shows an example of the interface including different areas that correspond to different controllable devices (e.g., washing machine, thermostat, robot cleaner, music system, water plants, and lighting system) that are registered with the system.

At step 216, the system tracks movement of the user's hand in physical space. In embodiments, the system uses one or more sensors to determine the position of the user's hand in physical space in real time (or near real time). The sensors may include but are not limited to one or more of: a gyroscope in the smartwatch, an accelerometer in the smartwatch, a camera in the smartwatch, an ultrasonic sensor in the smartwatch, and an infrared sensor in the smartwatch. The system may also use one or more sensors outside of the smartwatch including, for example, one or more cameras in the smart-home environment. The system may determine the position of the user's hand in physical space using the data from one or more of these sensors using position determination techniques. As indicated at arrow 217, the system provides feedback to the user based on detecting the user's hand in the space associated with one of the areas of the display. The feedback may be haptic and/or visual. In a haptic implementation, the system may cause the smartwatch to vibrate a unique vibration (or set of vibrations) depending on the area of the interface in which the user's hand is located. In a visual implementation, the system updates the display of the interface to highlight the area of the interface in which the user's hand is located. In either manner, the feedback allows the user to ascertain which area of the interface their hand is currently in so that they know which device they will control when providing a hand gesture.

With continued reference to FIG. 2, at step 218 the system detects a gesture the user performs with their hand that is in one of the defined physical spaces (from step 214). In embodiments, the system uses data from one or more of the sensors (e.g., the one or more sensors described at step 216) and hand gesture determination techniques to detect the type of gesture.

At step 219, the system provides a command corresponding to the detected gesture (from step 218) to the device currently selected in the interface. In embodiments, the system transmits data to the selected device, the data defining the detected gesture. As a result, the selected device receives the gesture-based command from the user and executes the command according to the device setup. In this manner, the user may utilize the system to provide gesture-based commands to plural devices quickly and easily by positioning their hand in a physical space that corresponds to an area in the interface and then performing the hand gesture while their hand is in the same physical space. As indicated at arrow 220, the system continues to track the user's hand in physical space after the user makes a gesture. In this manner, the user can quickly and easily switch to another device by moving their hand to another physical space corresponding to the area of the other device in the interface, and then perform another hand gesture in this space to provide a different command to the other device.

Still referring to FIG. 2, in accordance with further aspects of the invention the user may provide input to merge or split areas of the interface. In a merge implementation, the user provides input to merge two or more areas of the interface into a single area. Then, when the user selects this single area and provides a hand gesture, the system sends the data defining that hand gesture to all the plural devices associated with that single area. Using the interface 215a as an example, the user may provide input to merge the music system and lighting system areas. Then when the user's hand is detected in the physical space corresponding to these areas and the user provides a gesture, the system detects this single gesture and provides a command based on this gesture to each of the music system and lighting system. In this manner, a user may control two devices simultaneously with a single gesture. In a split implementation, the user provides input to split a single area of the interface into two or more sub-areas, with each of the sub-areas corresponding to a sub-system of the device. Using the interface 215a as an example, the user may provide input to split the water plants area into two sub-areas, each corresponding to different sub-systems of the plant watering system. Then the user may provide gesture-based commands individually to the sub-systems based on placing their hand in the physical space associated with the desired subsystem. In this manner, a user may control sub-systems of a single device separately. In both the merge and split implementations, the system refines the mapping of the physical space based on the merge or split, as indicated at arrow 222. Optionally, as indicated at arrow 223, the system saves the merge or split interface as a customized interface in the data corpus 202. In this manner, the next time the user interacts with the system, the system will obtain this customization data at step 212 and customize the interface at step 213 as described herein.

In accordance with additional aspects of the invention, the system permits a user to select one of the areas of the interface using touch input to the touchscreen display of the smartwatch. For example, the system may show that the user has a particular area of the interface selected, e.g., according to steps 215 and 216. In this example, the user may override the initial area selection (e.g., based on their hand position in a physical location) by touching a different area of the interface displayed on the smartwatch. The user may then perform a hand gesture to provide a command to the device associated with the area they selected via touch. In this manner, the user may quickly and easily override the system area determination by touch selection to the smartwatch. In this embodiment, the system may be configured to re-define the physical areas based on the user override. For example, the system may be configured to detect the physical location of the user's hand when the user performs the gesture immediately after the override. The system may then re-perform step 214 using detected physical location of the user's hand as the starting point, i.e., as being mapped to the area of the interface that the user selected with the override, and then map the other areas of the interface to respective physical spaces relative to that starting point.

In accordance with additional aspects of the invention, the system permits a user to push their customized interface to another user. As described herein, a user may customize their interface for a particular embodiment. The customization may include, for example, merging certain areas and/or splitting other areas of the interface for devices in the user's home. There are situations where a different user might visit the same environment and wish to utilize the customized interface of the first user who has already optimized the interface for this particular embodiment. In this example, when the second user registers with the system (e.g., at step 201), the system pushes the first user's customized interface to the second user. In this example, when the second user wishes to provide gesture-based controls to one or more device in the environment, the system displays the customized interface on the second user's smartwatch (instead of the default interface). In this manner, the first user may share their optimized interface layout with a guest who is visiting the environment. In embodiments, the first user saves their customized interface (e.g., in the data corpus 202) and adjusts the settings of the system to push the customized interface to other users that register with the system.

Figure 3:
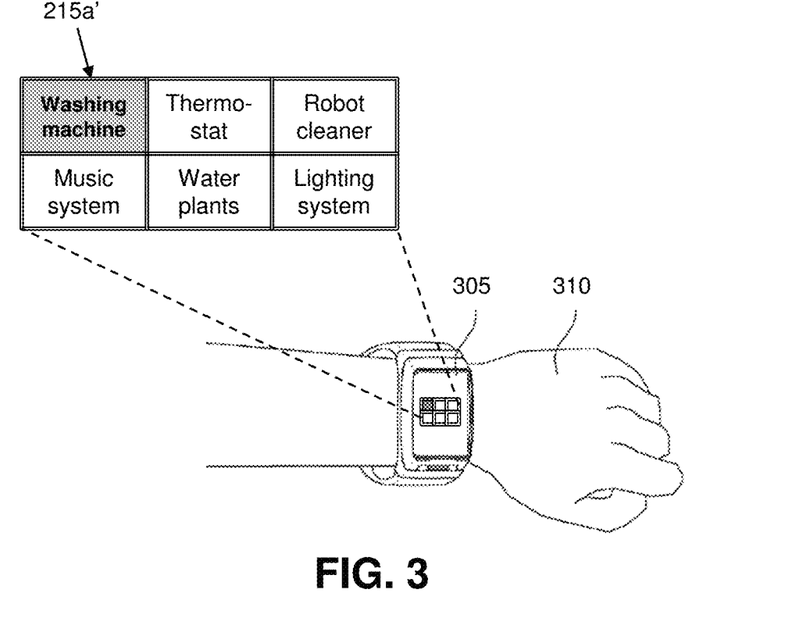
FIGS. 3 and 4 show an example of a user selecting areas in an interface in accordance with aspects of the invention.
Figure 4:
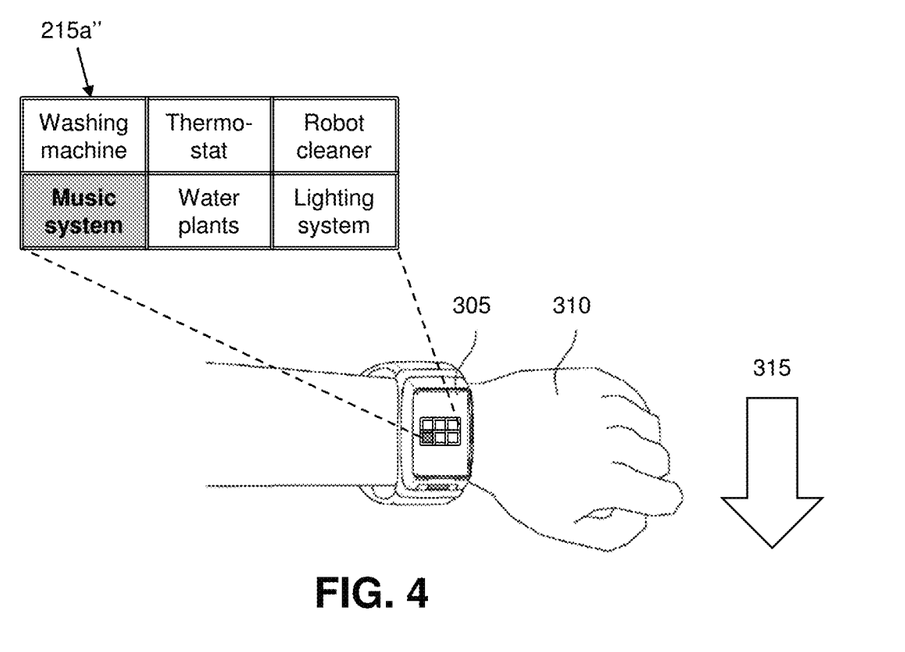

FIGS. 3 and 4 show an example of a user selecting areas in the interface. As shown in FIG. 3, the user's smartwatch 305 displays the interface 215a' with the washing machine selected due to the user's hand 310 being detected in the physical space that is mapped to the washing machine area. In the example of FIG. 3, if the user makes a gesture with their hand in this physical space, then the system will send the gesture command to the washing machine. As shown in FIG. 4, the user moves their hand 310 (e.g., downward in this example as indicate by arrow 315) and the system detects this movement to a different physical space mapped to the music system area of the interface 215a''. As a result, the system changes the interface 215a'' to highlight the music system area. In the example of FIG. 4, if the user makes a gesture with their hand in this physical space, then the system will send the gesture command to the music system.

Figure 5:
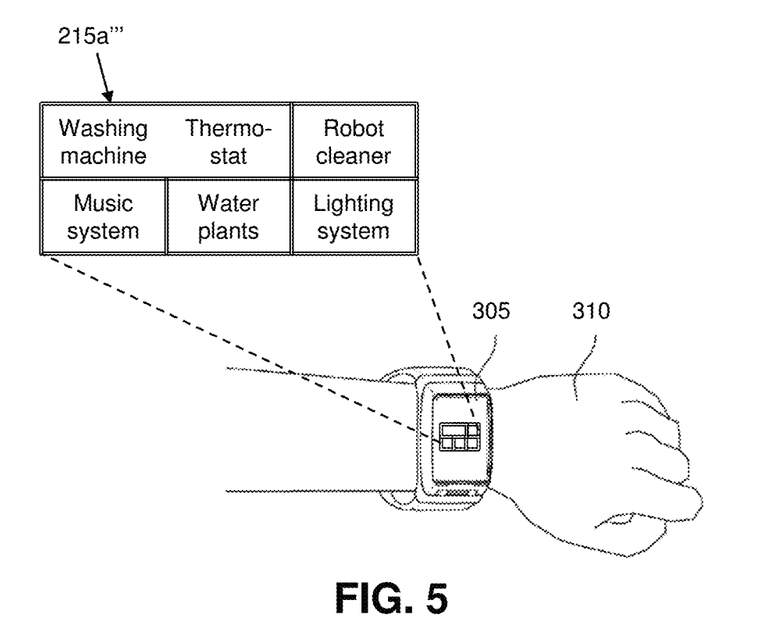
FIG. 5 shows an example of an interface where two areas have been merged in accordance with aspects of the invention.

FIG. 5 shows an example of the interface 215a''' where two areas have been merged. In this example, the washing machine and thermostat areas are merged into a single area. In the example of FIG. 5, if the user makes a gesture with their hand in the physical space mapped to the merged area, then the system will send the gesture command to both the washing machine and the thermostat.

Figure 6:
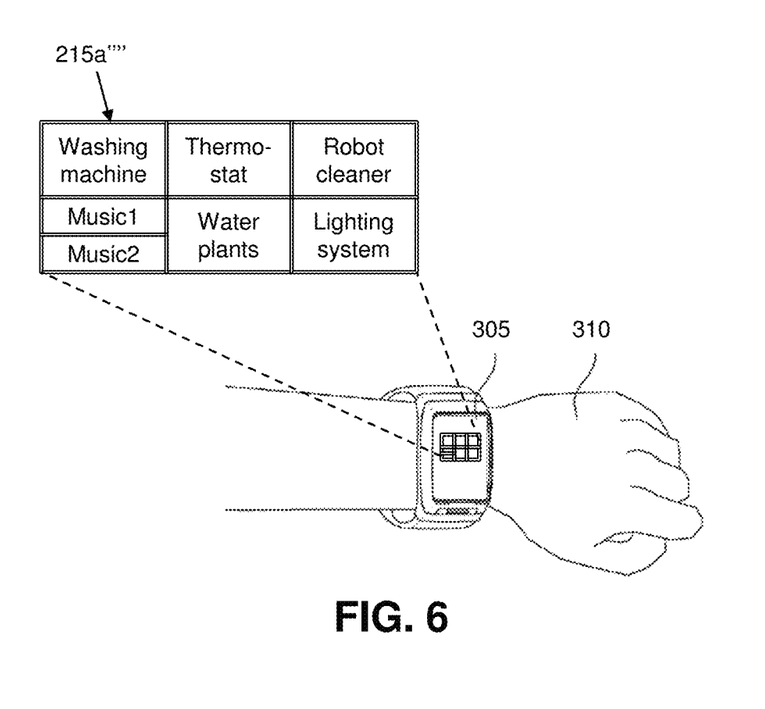
FIG. 6 shows an example of an interface where one area has been split in accordance with aspects of the invention.

FIG. 6 shows an example of the interface 215a'''' where one area has been split. In this example, the music system area is split into separate music1 and music2 sub-areas. In the example of FIG. 6, the user can individually control separate sub-systems of the music system (e.g., subsystem music1 and subsystem music2, for example speakers in a first room and different speakers in a second room) by selecting the appropriate sub-area.

Figure 7:
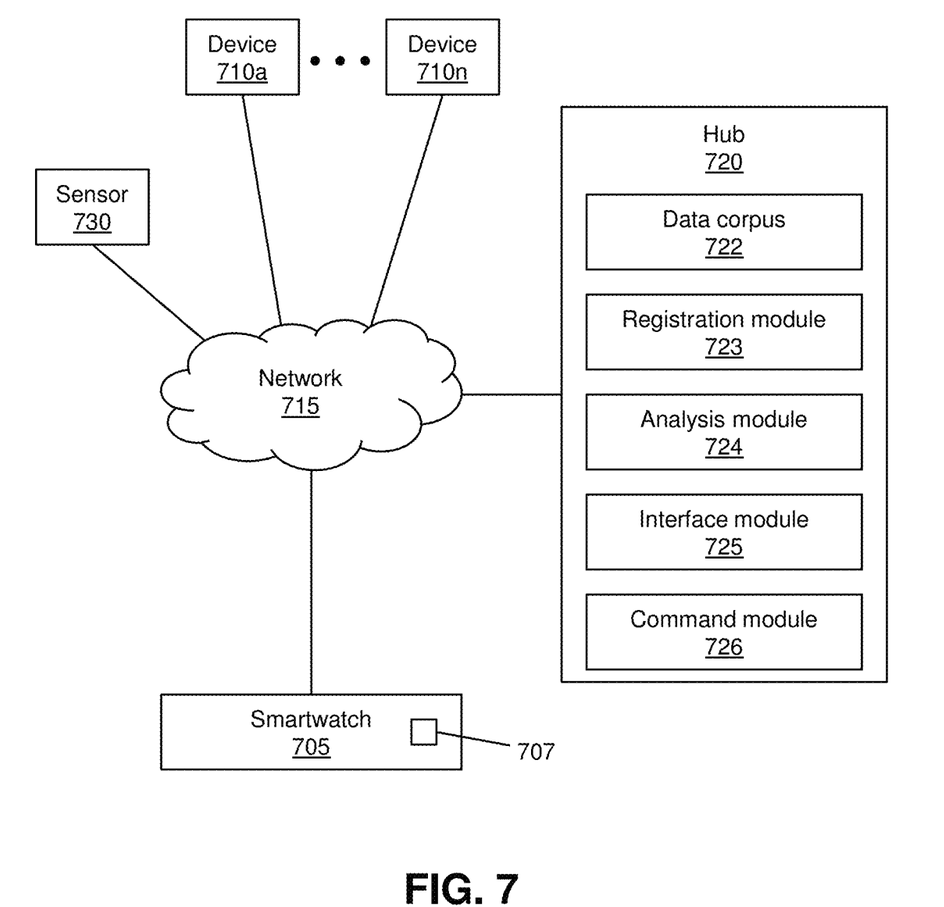
FIG. 7 shows a block diagram of an exemplary environment in accordance with aspects of the invention.

FIG. 7 shows a block diagram of an exemplary environment in accordance with aspects of the invention. In embodiments, the environment includes a smartwatch 705 and plural devices 710a-n connected to a network 715. The network 715 may comprise a LAN such as a home network, although other networks and combinations of networks may be used. The smartwatch 705 may correspond to the smartwatch 305 shown in FIGS. 3-6 and described in FIGS. 2-6. The devices 710a-n comprise any number "n" of computing devices that are configured to be controlled using gesture-based commands. Such devices are typically found in smart home environments and may include smart appliances (e.g., washing machine, refrigerator, stove, etc.), smart lighting systems (e.g., smart bulbs and smart outlets), smart thermostats, networked music systems (e.g., single or multi-room audio systems connected to the home network), robotic cleaners (e.g., smart vacuums), and smart watering systems (e.g., single or multi-zone lawn sprinkler systems). These example are not limiting and other types of devices may be used. The devices 710a-n are configured to execute functions in response to receiving commands defined in terms of gestures. Typical gestures include hand gestures such as swiping, twisting, pinching, poking, etc. Using the music system as an example, control gestures may include: swiping a hand to the right to fast forward, swiping a hand to the left to rewind, twisting the hand clockwise to increase the volume, twisting the hand counterclockwise to decrease the volume, poking using a finger to pause or restart, and pinching using plural fingers to turn off. These gestures are merely exemplary, and other gestures may be used with the devices 710a-n.

In embodiments, different ones of the devices 710a-n may be programmed with different gestures. Additionally, certain ones of the devices 710a-n may be programmed with the same gestures as other ones of the devices 710a-n. For example, the music system may be programmed with twisting the hand clockwise to increase the volume and twisting the hand counterclockwise to decrease the volume, and the lighting system may be programmed with twisting the hand clockwise to increase the brightness and twisting the hand counterclockwise to decrease the brightness.

In embodiments, the smartwatch 705 comprises at least one sensor 707 that is used to detect a location of a user's hand wearing the smartwatch 705 and/or a gesture made by the hand. The at least one sensor 707 may include one or more of: a gyroscope in the smartwatch, an accelerometer in the smartwatch, a camera in the smartwatch, an ultrasonic sensor in the smartwatch, and an infrared sensor in the smartwatch. The environment may also use one or more sensors 730 outside of the smartwatch including, for example, one or more cameras, proximity sensors, etc., in the smart-home environment.

According to aspects of the invention, the environment includes a hub 720 also connected to the network 715. The hub 720 is a computing device that includes one or more elements of the computer system/server 12. In embodiments, the hub 720 stores a data corpus 722, which may be the data corpus 202 of FIG. 2. In embodiments, the hub 720 comprises a registration module 723, analysis module 724, interface module 725, and command module 726, each of which may comprise one or more program modules such as program modules 42 described with respect to FIG. 1. In implementations, the modules 723-726 are programmed to carry out the functions described with respect to FIG. 2. The hub 720 may include additional or fewer modules than those shown in FIG. 7. In embodiments, the functionality of separate modules may be integrated into a single module. Additionally, or alternatively, the functionality of a single module may be implemented as multiple modules. Moreover, the quantity of devices and/or networks in the environment is not limited to what is shown in FIG. 7. In practice, the environment may include additional devices and/or networks; fewer devices and/or networks; different devices and/or networks; or differently arranged devices and/or networks than illustrated in FIG. 7.

In accordance with aspects of the invention, the registration module 723 is configured to register users with the system as described at step 201 of FIG. In embodiments, the registration module 723 is also configured to add/remove devices 710a-n to/from the system as described at steps 203 and 204 of FIG. 2.

In accordance with aspects of the invention, the analysis module 724 is configured to determine contexts and historical usage of the devices 710a-n, and to map contexts to devices as described at steps 205, 206, and 207 of FIG. 2. In accordance with aspects of the invention, the analysis module 724 is further configured to predict which devices from all devices 710a-n to include in the interface at any particular time. It is envisioned that the number of devices 710a-n exceeds the number of areas in the interface. In this scenario, because not all devices can be represented by an area in the interface at the same time, the system predicts which devices the user is most likely to interact with and includes these predicted devices in the display. The prediction can be based on current context, historical usage of the devices, or both.

Because the context and historical usage patterns can be different at different times, the predicted devices included in the display can be different at different times. As a result, the interface may include different subsets of the devices 710a-n at different times based on the prediction.

Context may be based on a state of one or more of the devices 710a-n. State may include on and off state of a single device. For example, if a smart oven is turned on for cooking, then that can be an indicator that the user is likely to interact with the oven, and the analysis module 724 takes this state into account when predicting which devices to include in the interface. In another example, if smart lights in a room are off and the user enters the room, then this can be an indicator that the user is likely to interact with the lights (e.g., to turn them on), and the analysis module 724 takes this state into account when predicting which devices to include in the interface. State may also include the on and off state of plural devices. For example, if the smart television is on and the user receives a telephone call on their smart speaker, then this can be an indicator that the user is likely to interact with the both the television (e.g., to turn down the volume) and the smart speaker (e.g., to answer the call), and the analysis module 724 takes these states into account when predicting which devices to include in the interface. These examples are for illustration and not intended to be limiting. Other contexts may be used in predicting which devices to include in the display.

Historical usage may be based on how the user has interacted with one or more of the devices 710a-n in the past. The analysis module 724 may be programmed to analyze the data corpus to determine patterns of historical usage of the devices 710a-n. For example, analysis of the data corpus may reveal that the user interacts with the smart speaker every day at 7:00 AM (e.g., to play news radio), and the analysis module 724 takes this pattern into account when predicting which devices to include in the interface at 7:00 AM. This example is for illustration and not intended to be limiting. Other historical usages may be used in predicting which devices to include in the display.

A combination of context and historical usage may be based on how the user has interacted with one or more of the devices 710a-n in the past relative to the state of one or more other devices 710a-n. For example, analysis of the data corpus may reveal that when the user interacts with the oven and music system during a same time period, the user subsequently interacts with the lighting system (e.g., to turn on lights in the dining room) and also interacts with a smart speaker (e.g., to intercom call family members to dinner). In this example, the analysis module 724 takes this pattern and context into account when predicting which devices to include in the interface at a time when the user is interacting with the oven and music system during a same time period. This example is for illustration and not intended to be limiting. Other combinations of context and historical usage may be used in predicting which devices to include in the display.

In accordance with aspects of the invention, the interface module 725 is configured to generate the interface, map the interface to physical space, and cause the smartwatch to display the interface as described at steps 208-215 of FIG. 2. In embodiments, in response to the analysis module 724 predicting which devices to include in the interface at a given time, the interface module 725 generates the interface to include areas corresponding to the precited devices. For example, if there are nine devices 710a-n and the analysis module 724 predicts the user is most likely to interact with a particular six of those nine right now, then the interface module 725 generates the interface to include six areas corresponding to the six precited devices. In this manner, the interface includes areas corresponding to the devices that the system thinks the user is most likely to interact with based on the current time, context, and historical usage patterns. In embodiments, the interface module 725 generates the interface using a default template, e.g., based a stored data object defining the default template. In other embodiments, the interface module 725 generates the interface using data that defines a customized interface, for example, based on a user's prior input to the system that define the customization. In one example, the customization may include merged or split areas of the interface previously defined by the user. In another example, the customization may include different devices to include in the interface at different times of day or in different contexts.

In implementations, the interface module 725 maps the generated interface to physical space and causes the smartwatch to display the interface. As described with respect to FIG. 2, the mapping may include defining a respective three-dimensional volume in physical space for each of the areas in the interface. In embodiments, the interface module 725 causes the hub 720 to transmit data to the smartwatch 705 that causes the smartwatch 705 to display the interface. In embodiments, the interface module 725 is also configured to perform the merge and/or split functions described with respect to steps 221-223 of FIG. 2.

In accordance with aspects of the invention, the command module 726 is configured to detect a location of a user's hand in space (e.g., as at step 216 of FIG. 2), detect a gesture (e.g., as at step 218 of FIG. 2), and issue a command to a device based on the gesture (e.g., at step 219 of FIG. 2). In embodiments, the command module 726 detects a position in physical space of a user's hand wearing the smartwatch 705 using position determination techniques with data from one or more of the sensors 707 and/or 730. In embodiments, the command module 726 detects a gesture by a hand wearing the smartwatch 705 using gesture determination techniques with data from one or more of the sensors 707 and/or 730. In embodiments, the command module 726 uses the mapping (from steps 211 and 214 of FIG. 2) to determine which device is selected based on which physical space the hand is detected in. According to aspects of the invention, based on detecting a hand gesture and determining which device is selected, the command module 726 transmits data defining the hand gesture to the selected one of the devices, thereby causing the selected one of the devices to execute a command based on the hand gesture.

FIG. 7 shows the data corpus 702 and modules 723-726 as part of the hub 720. In other implementations, one or more of the data corpus 702 and one or more of the modules 723-726 is included in the smartwatch 705. In a particular embodiment, the functionality of all the modules 723-726 is programmed in one or more program modules included on and executed by the smartwatch 705.

Figure 8:
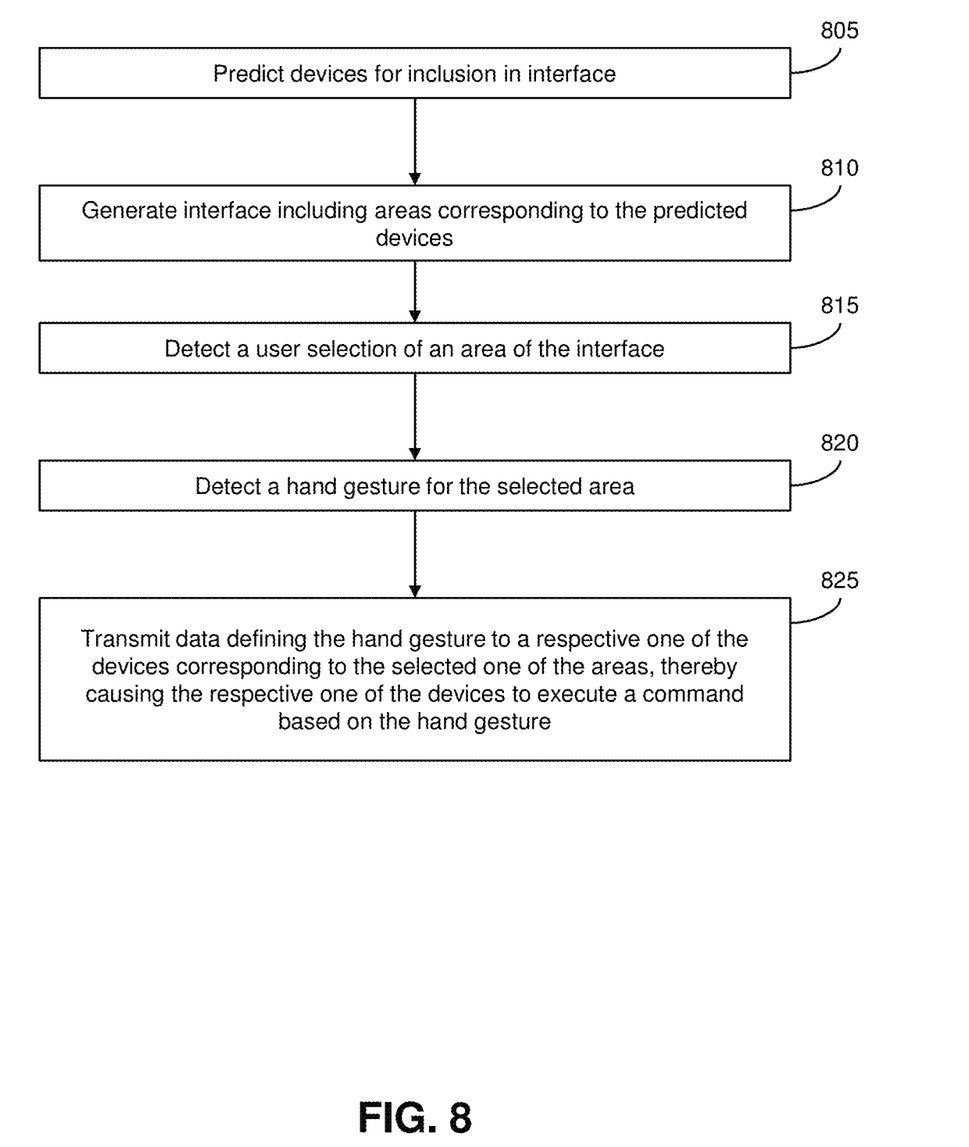
FIG. 8 shows a flowchart of an exemplary method in accordance with aspects of the invention.

FIG. 8 shows a flowchart of an exemplary method in accordance with aspects of the present invention. Steps of the method may be carried out in the environment of FIG. 7 and are described with reference to elements depicted in FIG. 7.

At step 805, the system predicts devices for inclusion in the interface. In embodiments, and as described with respect to FIG. 7, the analysis module 724 predicts a subset of devices from all devices 710a-n that the user is most likely to interact with at the current moment. The prediction may be based on context, historical usage, or both.

At step 810, the system generates an interface including areas corresponding to the devices that were predicted at step 805. In embodiments, and as described with respect to FIG. 7, the interface module 725 generates the interface, maps the areas of the interface to physical space, and causes the smartwatch to display the interface.

At step 815, the system detects a user selection of one of the areas of the interface that was generated at step 810. In embodiments, and as described with respect to FIG. 7, the command module 726 detects the user's hand in the physical space corresponding to one of the areas of the interface. Step 815 may include providing feedback to the user based on the detecting the user selection of the one of the areas of the interface. As described herein, the feedback may be haptic and/or visual.

At step 820, the system detects a hand gesture for the area that was selected at step 815. In embodiments, and as described with respect to FIG. 7, the command module 726 detects the gesture using one or more sensors.

At step 825, the system transmits data defining the hand gesture (from step 820) to a respective one of the devices corresponding to the selected one of the areas. In embodiments, and as described with respect to FIG. 7, the command module 726 transmits data defining the detected gesture to the selected one of the devices 710a-n, which causes the device to execute a command based on the gesture.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
predicting, by a hub computing device, devices for inclusion in an interface, the predicted devices being a subset of plural devices in a smart home environment, wherein each of the plural devices is configured to execute functions in response to receiving commands defined in terms of gestures;
generating, by the hub computing device, the interface including areas corresponding to the devices;
cause a smartwatch worn by a user to display the interface;
map the areas to respective physical spaces;
detecting, by the hub computing device, a hand gesture of the user in one of the physical spaces using data from a sensor in the smartwatch; and
transmitting, by the hub computing device, data defining the hand gesture to a respective one of the devices corresponding to the one of the physical spaces, thereby causing the respective one of the devices to execute a command based on the hand gesture, wherein the transmitting comprises transmitting the data from the hub computing device to the respective one of the devices.

2. The method of claim 1, wherein the predicting is based on context.

3. The method of claim 1, wherein the predicting is based on historical usage.

4. The method of claim 1, wherein the predicting is based on a combination of context and historical usage.

5. The method of claim 1, further comprising:
receiving user input to merge two of the areas of the interface into a merged area, the two of the areas comprising a first area associated with a first one of the devices and a second area associated with a second one of the devices;
re-generating the interface showing the merged area;
detecting a user selection of the merged area;
detecting another hand gesture associated with merged area; and
transmitting data defining the other hand gesture to the first device and the second device, thereby causing the first device and the second device to execute respective commands each based on the other hand gesture.

6. The method of claim 1, further comprising:
receiving user input to split one of the areas of the interface into two sub-areas;
re-generating the interface showing the two sub-areas;
detecting a user selection of one of the two sub-areas;
detecting another hand gesture associated with the selected one of the two sub-areas;
transmitting data defining the other hand gesture to one of the devices corresponding to the selected one of the two sub-areas, thereby causing a sub-system of the one of the devices to execute a command based on the other hand gesture.

7. The method of claim 1, further comprising:
receiving user input, from a first user device, defining customization of the interface;
storing data defining the customization of the interface;
receiving input from a second user device;
generating a customized interface using the data defining the customization of the interface; and
pushing the customized interface to the second user device.

8. The method of claim 1, further comprising providing feedback to the user based on the detecting the hand gesture.

9. The method of claim 8, wherein the feedback is haptic.

10. The method of claim 8, wherein the feedback is visual in the interface.

11. A computer program product comprising one or more computer readable storage media having program instructions collectively stored on the one or more computer readable storage media, the program instructions executable to cause a hub computing device to:
- predict devices for inclusion in an interface, the predicted devices being a subset of plural devices in a smart home environment, wherein each of the plural smart devices is configured to execute functions in response to receiving commands defined in terms of gestures;
- generate the interface including areas corresponding to the devices;
- cause a smartwatch worn by a user to display the interface;
- map the areas to respective physical spaces;
- detect a gesture of a hand, of the user, in one of the physical spaces using data from a sensor in the smartwatch; and
- transmit data defining the gesture to a respective one of the devices corresponding to the one of the physical spaces, thereby causing the respective one of the devices to execute a command based on the gesture, wherein the transmitting comprises transmitting the data from the hub computing device to the respective one of the devices.

12. The computer program product of claim 11, wherein:
- a total number of the plural smart devices exceeds a number of spaces in the interface; and
- the predicting is based on:
  - context that is based on an on and off state of each respective one of the plural smart devices; and
  - historical usage that is based on how the user has interacted with one or more of the plural smart devices in the past.

13. The computer program product of claim 11, wherein the program instructions are executable to provide feedback to the user based on detecting the hand in different ones of the respective physical spaces.

14. The computer program product of claim 13, wherein the feedback is haptic feedback emitted by the smartwatch.

15. The computer program product of claim 13, wherein the feedback is visual in the interface displayed on the smartwatch.

16. A system comprising:
- a processor, a computer readable memory, one or more computer readable storage media, and program instructions collectively stored on the one or more computer readable storage media, the program instructions executable to cause a hub computing device to:
- predict devices for inclusion in an interface, the predicting being based on a combination of context and historical usage of plural devices in a smart home environment, wherein the predicted devices comprise a subset of the plural devices in the smart home environment, and wherein each of the plural devices is configured to execute functions in response to receiving commands defined in terms of gestures;
- generate the interface including areas corresponding to the predicted devices;
- cause a smartwatch worn by a user to display the interface;
- map the areas to respective physical spaces;
- detect a gesture of a hand, of the user, in one of the physical spaces corresponding to one of the areas using data from a sensor in the smartwatch; and
- transmit data defining the gesture to a respective one of the devices corresponding to the one of the physical spaces, thereby causing the respective one of the devices to execute a command based on the gesture, wherein the transmitting comprises transmitting the data from the hub computing device to the respective one of the devices.

17. The system of claim 16, wherein the program instructions are executable to:
- receive user input to merge two of the areas; and
- re-generate the interface showing a merged area in place of the two of the areas.

18. The system of claim 16, wherein the program instructions are executable to:
- receive user input to split one of the areas; and
- re-generate the interface showing two sub-areas in place of the one of the areas.

19. The system of claim 16, wherein the program instructions are executable to:
- receive user input defining a customization of the interface;
- store data defining the customization;
- generate a customized interface using the data defining the customization; and
- automatically push the customized interface to a guest device.

* * * * *